Dec. 12, 1950      R. CHELBORG ET AL      2,533,311
MACHINE FOR CUTTING TAPERED INGOTS

Filed Feb. 18, 1947      2 Sheets-Sheet 2

INVENTORS
RUDOLPH CHELBORG
LLOYD W. YOUNG
BY
ATTORNEY

Patented Dec. 12, 1950

UNITED STATES PATENT OFFICE 2,533,311

MACHINE FOR CUTTING TAPERED INGOTS

Rudolph Chelborg, Maplewood, and Lloyd W. Young, Elizabeth, N. J., assignors to The Linde Air Products Company, a corporation of Ohio Application February 18, 1947, Serial No. 729,284

7 Claims. (Cl. 266—23)

This invention relates to multiple oxy-fuel cutting of tapered stock, and more particularly to method and apparatus for making simultaneously a plurality of spaced kerfs perpendicular to the axis of the stock.

In the manufacture of circular blanks for forging locomotive wheels and the like, the metal is cast in tapered ingots, and the ingots are mechanically sliced into wheel blanks on a lathe. This cutting operation is expensive, and requires considerable power and skillful manipulation of the work to get it into and out of the lathe, as well as skillful manipulation of the lathe for performing the cutting operation. It is therefore the main object of the present invention to provide method and apparatus for slicing a tapered ingot into circular blanks without rotating the ingot.

Oxy-acetylene blowpipe machines have been developed for multiple cutting of stock of uniform cross-section, but these are not adaptable for tapered stock. For example, the elevation of the blowpipe determined by the large end of the ingot raises the blowpipe for the small end too far from the stock for satisfactory cutting. Also, the cutting stroke determined by the larger end causes waste of gases before the blowpipe for the small end reaches the stock, or after the small end is cut through, or both. Furthermore, with the ingot lying on its side or on a horizontal cutting bed, the cuts would be inclined to the axis of the tapered ingot, and result in elliptical, instead of circular slices.

Other objects of the invention therefore are to provide lower elevation and shorter strokes for the blowpipes at the smaller end of the ingot than for the larger end, and to maintain the kerfs perpendicular to the axis of the ingot.

According to the present invention a plurality of cutting oxygen orifices are moved in axially spaced planes perpendicular to the axis of the stock and along arcs of different radii proportional to the taper and the axial spacing, and successive positions of the cutting oxygen streams are maintained parallel during the travel of the orifices along said arcs. The orifices are spaced longitudinally along the generatrix of a conical surface coaxial with the stock. The blowpipes are carried by a supporting rod which is provided with universal joints at the respective end portions thereof. Crank arms adjustable in length are connected through supporting cantilever arms to the universal joints to provide the desired movement of the blowpipes. Preferably the blowpipe holders are pivoted to the supporting rod, and connected by a tie rod to an arm rigid with a cruciform member of one of the universal joints, to maintain the blowpipe at all times in planes perpendicular to the axis of the stock.

Other objects and features of novelty will be apparent from the following description and the accompanying drawing, in which.

Figure 1:
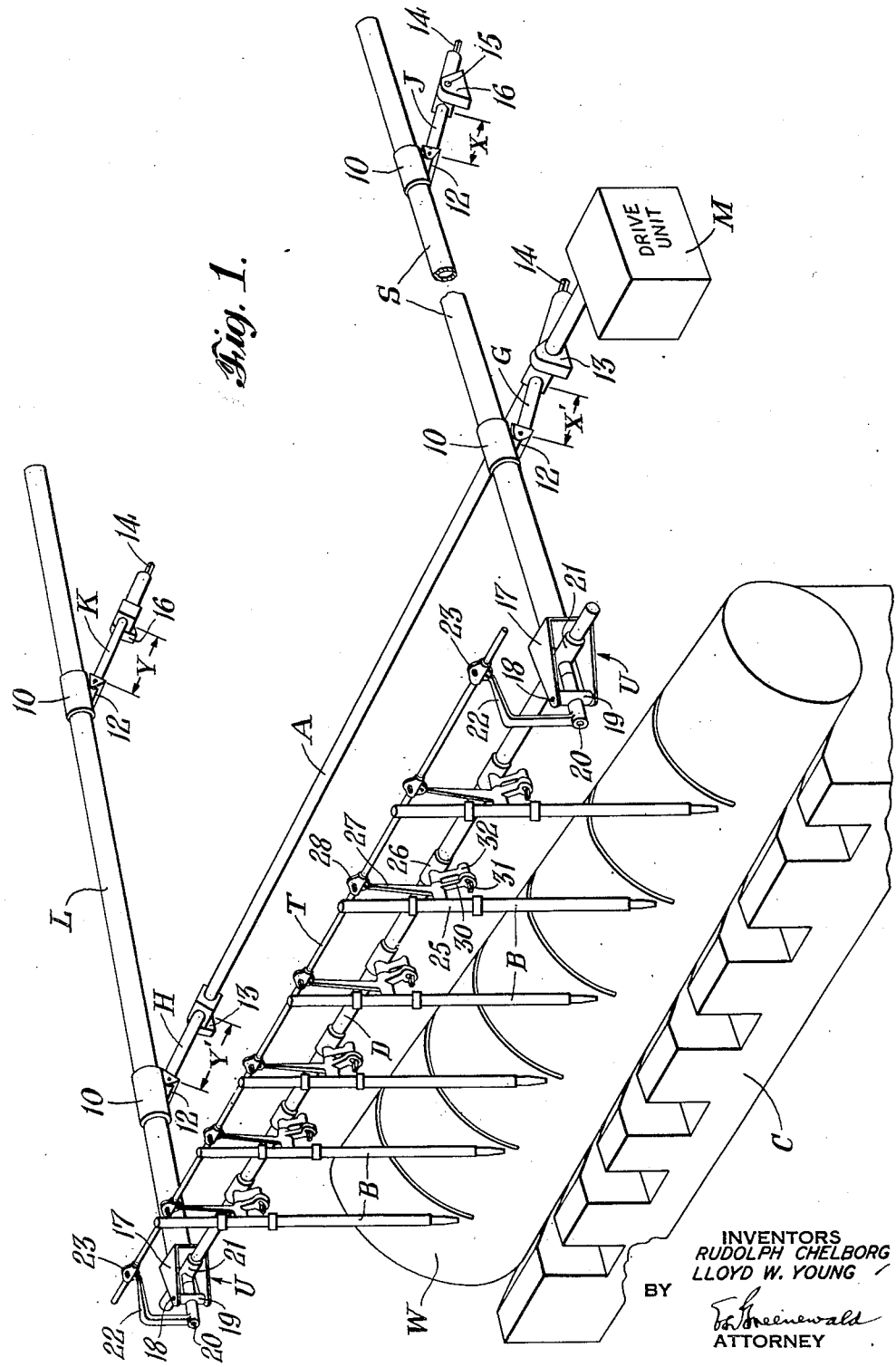
Fig. 1 is a perspective view of a machine according to, and for carrying out the method of the present invention.
Figure 2:
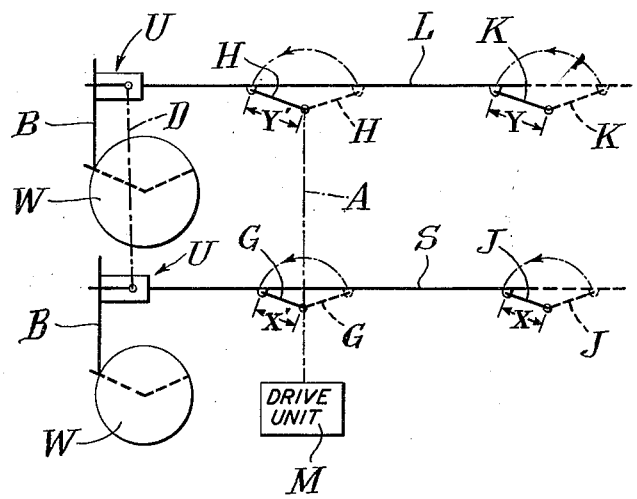
Fig. 2 is a diagram of the motion of the blowpipes.
Figure 3:
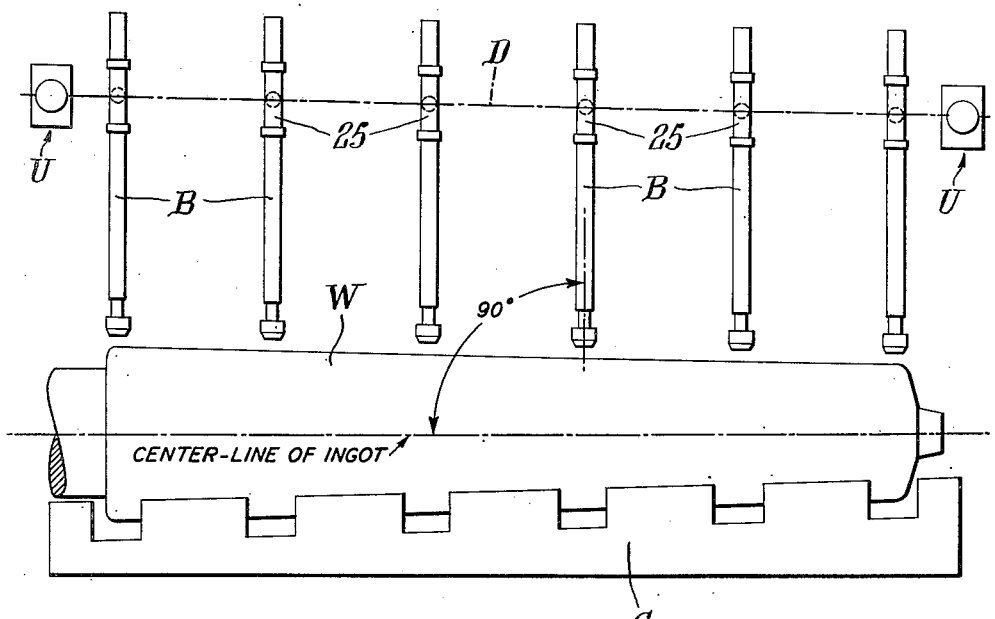
Fig. 3 is a front elevation of the ingot and the blowpipes.

In the drawings the ingot W is supported on a cradle C in position to maintain the axis of the ingot horizontal. A plurality of oxy-acetylene blowpipes B are mounted for movement in arcs above the ingot in planes perpendicular to the ingot axis. The blowpipes B are spaced along a carrier rod D, end portions of which are provided with universal joints U. Motion is transmitted to the universal joints U from crank arms G and H rigid with a common drive shaft A which is driven by a drive unit M. The crank arms G and H are of different lengths proportional to the taper of the ingot and their distance from each other. Preferably the universal joints U connect the carrier rod D to side supporting cantilever arms S and L, in turn respectively pivoted on the outer ends of the crank arms G and H, and also respectively pivoted to the ends of crank arms J and K of respectively equal length to the front crank arms G and H for respective parallelogram movements. The blowpipes B are pivoted on the carrier rod D, and are connected by a tie rod T which maintains them in planes perpendicular to the ingot axis during their arcuate movements. With this arrangement the blowpipe near the larger end of the ingot swings through an arc of larger radius than the blowpipe near the smaller end and the intermediate blowpipes swing in arcs of intermediate lengths.

In the form of the machine shown in the drawing the cantilever arms S and L are tubular and are locked in clamps 10, each of which is pivoted at 12 to a respective crank arm G, H, J, K. The length of each crank arm is adjustable by turning a screw 14. The rear crank arms J and K are independently mounted on trunnions 15 journaled in dual bearings 16. The front crank arms G and H are connected by the shaft A which is journaled in bearings 13 and driven by the drive unit M. The lengths of the crank arms H and K control the arcuate movement of the blowpipe at the larger end of the ingot W, and the lengths of the crank arms G and J control the arcuate movement of the blowpipe at the smaller end of the ingot.

Each of the cantilever arms S and L terminates at its forward end in a rigid clevis 17 in which is mounted a vertical pivot pin 18 for a cruciform bearing member 19. The horizontal bore of the member 19 receives a horizontal pivot pin 20, which is rigidly secured to an adjustable sleeve 21 on the carrier rod D in position perpendicular thereto, thus forming the universal joint U. An arm 22 rigid with the cruciform bearing member 19 is pivoted to a clamp 23 which grips the blowpipe tie rod T. The carrier rod D is securely clamped in one of the adjustable sleeves 21, but is adjustable in the other during the adjustments of the lengths of the crank arms G, H, J, K.

Each blowpipe B is adjustable vertically in a blowpipe holder 25 which is pivoted on a slide 26 adjustable along the carrier rod D. The blowpipe holder 25 has an upstanding arm 27 pivoted to a clamp 28 adjustable along the blowpipe tie rod T. The blowpipe holder 25 also has a depending arcuately slotted arm 30 adjustably receiving a locking screw 31 on an arm 32 rigid with the slide 26.

When adjusting slide 26 along the rod D, the clamp 28 is loosened and the screw 31 tightened. This locks the blowpipe in vertical position. When the center distance of each blowpipe has been correctly adjusted the clamp 28 is tightened and the screw 31 loosened.

The crank arms H and K are adjusted to a length slightly longer than the radius of the cut at the large end of the ingot, as shown at Y and Y'. The crank arms G and J are adjusted to a length slightly shorter than the radius of the cut at the smaller end of the ingot, as shown at X and X'. Due to the taper of the ingot and the distance of the vertical plane containing the center line of side supporting cantilever arm S from the cut, the crank arms at the smaller end must be set shorter in length than the radius of the smallest cut to be made. The farther the aforementioned vertical plane is from the cut, the shorter this length becomes. Conversely, at the larger end of the ingot, a compensation must be made whereby the length of the corresponding crank arms is made longer than the radius of the largest cut.

The rotation of the crank arms G, H, J, K, is preferably 130 to 140 degrees total or 65 to 70 degrees each side of the vertical for all sizes of ingots.

From the foregoing description it will be readily apparent that the machine can be adjusted to cut tapered stock with the taper running in either direction as well as straight cylindrical sections.

What is claimed is:

1. Apparatus for multiple oxy-fuel cutting of tapered stock, which comprises a carrier rod, a plurality of cutting oxygen blowpipes spaced along said carrier rod, means for moving said carrier rod for moving said blowpipes transversely to said stock in arcs of different radii proportional to the taper and spacing, and interconnected mechanism for maintaining the cutting oxygen streams from said blowpipes in planes perpendicular to the axis of the stock while their blowpipes are traveling along said different arcs.

2. Apparatus for multiple oxy-fuel cutting of tapered stock, which comprises a support for spacing a plurality of cutting oxygen orifices in a line extending longitudinally of the stock, a common drive unit, mechanism actuated by said common drive unit for moving said line of orifices to generate a portion of a conical surface coaxial with the stock, and a device interconnected with said mechanism for maintaining the cutting oxygen streams from said orifices in planes perpendicular to the axis of the stock during such movement.

3. Blowpipe machine for multiple oxy-fuel cutting of tapered stock, comprising a blowpipe supporting rod extending longitudinally of the stock, a plurality of blowpipes spaced along said rod, universal joints connected to end portions of said rod, and means for swinging said universal joints in planes perpendicular to the longitudinal axis of the stock along arcs of different radii proportional to the taper of the stock.

4. Blowpipe machine for multiple oxy-fuel cutting of tapered stock, comprising a blowpipe supporting rod extending longitudinally of the stock, a plurality of blowpipes spaced along said rod, cruciform members each having one axis pivoted to a respective end portion of said rod, crank arms of different lengths respectively pivotally connected to the other axes of said cruciform members, and means for turning said crank arms.

5. Blowpipe machine for multiple oxy-fuel cutting of tapered stock, comprising a blowpipe supporting rod extending longitudinally of the stock, a plurality of blowpipe holders pivoted to said rod at spaced intervals therealong, cruciform members each having one axis pivoted to a respective end portion of said rod, supporting arms respectively pivoted to the other axis of said cruciform members, an arm rigid with one of said cruciform members, and a tie rod pivotally connecting said rigid arm to each of said pivoted blowpipe holders.

6. Blowpipe machine for multiple oxy-fuel cutting of tapered stock, comprising a shaft journaled on an axis spaced from but parallel to the axis of the stock, crank arms rigid with said shaft at opposite end portions thereof in the same radial plane and having unequal lengths proportional to the taper of the stock and the axial spacing of said crank arms, means for mounting a plurality of blowpipes spaced along the stock, and means for transmitting movement from said crank arms to said blowpipes.

7. Blowpipe machine for multiple oxy-fuel cutting of tapered stock, comprising a blowpipe supporting rod, a plurality of blowpipes pivoted to said rod at spaced intervals therealong, cantilever arms for supporting said rod, universal joints connecting said rod to said arms, a tie rod parallel to said supporting rod and connecting said blowpipes for simultaneous movement about their pivots, a pair of crank arms pivoted to each cantilever arm, the arms of one pair being of different length from those of the other, means for simultaneously turning one arm of each pair, and means connected to said rod for maintaining said blowpipes perpendicular to the axis of said tapered stock.

RUDOLPH CHELBORG.
LLOYD W. YOUNG.

REFERENCES CITED

The following references are of record in the file of this patent:

UNITED STATES PATENTS

| Number | Name | Date |
|---|---|---|
| 481,893 | Bryce et al. | Aug. 30, 1892 |
| 1,352,381 | Reynolds | Sept. 7, 1920 |
| 2,347,245 | Anderson | Apr. 25, 1944 |
| 2,365,235 | Young et al. | Dec. 19, 1944 |
| 2,404,600 | Scovill, Jr. | July 23, 1946 |
| 2,419,983 | Anderson | May 6, 1947 |
| 2,443,251 | Keller | June 15, 1948 |